United States Patent
Tezuka et al.

(10) Patent No.: US 12,103,529 B2
(45) Date of Patent: Oct. 1, 2024

(54) DRIVE ASSIST DEVICE

(71) Applicant: TOYOTA JIDOSHA KABUSHIKI KAISHA, Toyota (JP)

(72) Inventors: Yuki Tezuka, Toyota (JP); Koki Suwabe, Toyota (JP); Tomoaki Igarashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 17/966,978

(22) Filed: Oct. 17, 2022

(65) Prior Publication Data

US 2023/0174066 A1 Jun. 8, 2023

(30) Foreign Application Priority Data

Dec. 3, 2021 (JP) ................................. 2021-196772

(51) Int. Cl.
| | | |
|---|---|---|
| *B60W 30/16* | (2020.01) | |
| *B60W 10/18* | (2012.01) | |
| *B60W 40/10* | (2012.01) | |
| *B60W 40/105* | (2012.01) | |

(52) U.S. Cl.
CPC .......... *B60W 30/162* (2013.01); *B60W 10/18* (2013.01); *B60W 40/105* (2013.01); *B60W 2554/80* (2020.02)

(58) Field of Classification Search
CPC ............. B60W 30/162; B60W 40/105; B60W 2554/80
See application file for complete search history.

(56) References Cited

U.S. PATENT DOCUMENTS

| | | | |
|---|---|---|---|
| 12,024,167 B2 * | 7/2024 | Kang | G06V 20/588 |
| 2017/0232966 A1 * | 8/2017 | Ishioka | B60W 50/082 701/96 |
| 2019/0168757 A1 * | 6/2019 | Tokimasa | B60W 40/02 |
| 2021/0188264 A1 | 6/2021 | Okuda et al. | |

FOREIGN PATENT DOCUMENTS

| | | |
|---|---|---|
| JP | 2012-153296 A | 8/2012 |
| WO | 2019/220717 A1 | 11/2019 |

* cited by examiner

*Primary Examiner* — Jacob M Amick
(74) *Attorney, Agent, or Firm* — Sughrue Mion, PLLC (57) ABSTRACT

In a drive assist device, a first condition that an inter-vehicle distance between a preceding vehicle and an own vehicle is smaller than a first threshold, a second condition that a speed of the preceding vehicle relative to the own vehicle is lower than a second threshold, a third condition that a speed of an adjacent vehicle that travels on an adjacent lane to the own vehicle is lower than a third threshold, and a fourth condition that an acceleration rate of the adjacent vehicle is lower than a fourth threshold are defined. When at least one of the first condition and the second condition and at least one of the third condition and the fourth condition are satisfied, the drive assist ECU executes acceleration restraint control of a driving device and/or a braking device such that an acceleration rate of the own vehicle is "0" or lower.

5 Claims, 3 Drawing Sheets

DRIVE ASSIST DEVICE

CROSS-REFERENCE TO RELATED APPLICATION

This application claims priority to Japanese Patent Application No. 2021-196772 filed on Dec. 3, 2021, incorporated herein by reference in its entirety.

BACKGROUND

1. Technical Field

The present disclosure relates to a drive assist device that controls a driving device and a braking device of an own vehicle such that the inter-vehicle distance between a preceding vehicle and the own vehicle coincides with a target value.

2. Description of Related Art

Conventionally, there has been proposed a drive assist device (referred to as a "conventional device" hereinafter) that executes cruise control to assist operations of an accelerator pedal and brake pedal of a vehicle (see Japanese Unexamined Patent Application Publication No. 2012-153296). Specifically, the conventional device controls a driving device and a braking device of the own vehicle such that the inter-vehicle distance between the preceding vehicle and the own vehicle coincides with a target value. For example, in the case where the preceding vehicle repeats acceleration and deceleration (in the case where the acceleration rate of the preceding vehicle frequently increases and decreases), the conventional device follows the speed fluctuation of the preceding vehicle, and fluctuates the speed of the own vehicle such that the inter-vehicle distance coincides with the target value.

SUMMARY

While the conventional device executes the cruise control, in the case where the preceding vehicle repeats acceleration and deceleration in a comparatively short time (in the case where the preceding vehicle repeats acceleration and deceleration in a comparatively short section), the own vehicle also repeats acceleration and deceleration so as to follow the preceding vehicle. For example, in the case where congestion has occurred on a lane (traveling lane) where the preceding vehicle and the own vehicle travel, there is a high possibility that acceleration and deceleration are repeated as described above. When the speed of the own vehicle is comparatively greatly fluctuated in a short time in this way, there is fear that an occupant of the own vehicle feels uncomfortable.

An object of the present disclosure is to provide a drive assist device that can reduce the repeat of acceleration and deceleration at the time of congestion and can reduce the uncomfortable feeling of the occupant of the vehicle.

For solving the above problem, a drive assist device (1) in the present disclosure includes:
   a driving device (20) configured to give driving power to a driving wheel of an own vehicle;
   a braking device (30) configured to give braking power to the driving wheel;
   a periphery sensor (50) configured to output surrounding information that is information relevant to a physical body in a periphery of the own vehicle; and
   a drive assist control device (10) configured to decide a target value of an inter-vehicle distance (L) between a preceding vehicle and the own vehicle based on the surrounding information, and to execute follow-up control to control the driving device and the braking device such that a measured value of the inter-vehicle distance coincides with the target value, the preceding vehicle traveling in front of the own vehicle, the measured value of the inter-vehicle distance being acquired based on the surrounding information, in which:
   a first condition (Z1) is defined as a condition that the inter-vehicle distance is smaller than a first threshold ($\delta$);
   a second condition (Z2) is defined as a condition that a speed of the preceding vehicle relative to the own vehicle is lower than a second threshold ($\varepsilon$);
   a third condition (Z3) is defined as a condition that a speed of an adjacent vehicle is lower than a third threshold ($\xi$), the adjacent vehicle being a vehicle that travels on a lane adjacent to a lane where the own vehicle is;
   a fourth condition (Z4) is defined as a condition that the acceleration rate of the adjacent vehicle is lower than a fourth threshold ($\eta$); and
   in a case where at least one of the first condition and the second condition is satisfied and where at least one of the third condition, and the fourth condition is satisfied, the drive assist control device executes acceleration restraint control to control either or both of the driving device and the braking device such that the acceleration rate of the own vehicle is "0" or lower.

In the case where the first condition and/or the second condition is satisfied and where the third condition and/or the fourth condition is satisfied, the drive assist control device according to the drive assist device in the present disclosure estimates that the congestion has not been resolved. In this case, the drive assist control device executes the acceleration restraint control to control the driving device and/or the braking device such that the acceleration rate of the own vehicle is "0" or lower. That is, with the present disclosure, in a situation (congestion) where there is a high possibility that the preceding vehicle repeats acceleration and deceleration, it is possible to restrain the own vehicle from repeating acceleration and deceleration while following up the preceding vehicle. Consequently, it is possible to reduce the uncomfortable feeling of the occupant of the own vehicle, compared to the conventional device (a device that does not have a function to estimate whether the congestion has been resolved).

In the drive assist device according to an aspect of the present disclosure:
   a fifth condition (Y1) may be defined as a condition that the inter-vehicle distance between the own vehicle and the preceding vehicle is smaller than a fifth threshold (B) that is smaller than the first threshold ($\delta$);
   a sixth condition (Y2) may be defined as a condition that the speed of the preceding vehicle relative to the own vehicle is lower than a sixth threshold (Y) that is smaller than the second threshold ($\varepsilon$);
   in a case where the fifth condition and the sixth condition are satisfied or in a case where either or both of the fifth condition and the sixth condition are unsatisfied, where at least one of the first condition and the second condition is satisfied, and where at least one of the third condition and the fourth condition is satisfied, the drive assist control device may execute the acceleration restraint control.

Thereby, in the case where the inter-vehicle distance and the relative speed are comparatively small, the own vehicle is not accelerated even when the preceding vehicle accelerates. That is, in the own vehicle, the repeat of acceleration and deceleration is reduced. Consequently, it is possible to reduce the uncomfortable feeling of the occupant of the own vehicle.

In the drive assist device according to another aspect of the present disclosure, in a case where the first condition to the fourth condition are satisfied, the drive assist control device may execute the acceleration restraint control.

In the case where the first condition and the second condition are satisfied and where the third condition and the fourth condition are satisfied, the drive assist control device according to the drive assist device in the aspect estimates that the congestion has not been resolved. In this case, the drive assist control device executes the acceleration restraint control. That is, in the own vehicle, the repeat of acceleration and deceleration is reduced. Consequently, it is possible to reduce the uncomfortable feeling of the occupant of the own vehicle.

In the drive assist device according to another aspect of the present disclosure, in a case where at least one of the first condition to the fourth condition has been unsatisfied during the execution of the acceleration restraint control, the drive assist control device may stop the execution of the acceleration restraint control.

In the case where at least one of the first condition to the fourth condition has been unsatisfied during the execution of the acceleration restraint control, the drive assist control device according to the drive assist device in the aspect estimates that the congestion has been ended, and stops the execution of the acceleration restraint control. That is, the own vehicle becomes a state where the own vehicle can accelerate. Thereby, it is possible to restrain the inter-vehicle distance from excessively increasing due to the stop of the acceleration of the own vehicle.

In the drive assist device according to another aspect of the present disclosure, the drive assist control device may prohibit the execution of the acceleration restraint control after the drive assist control device stops the execution of the acceleration restraint control and before a speed of the own vehicle exceeds a predetermined threshold.

Thereby, it is possible to restrain the acceleration restraint control from being frequently executed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration

Figure 1:
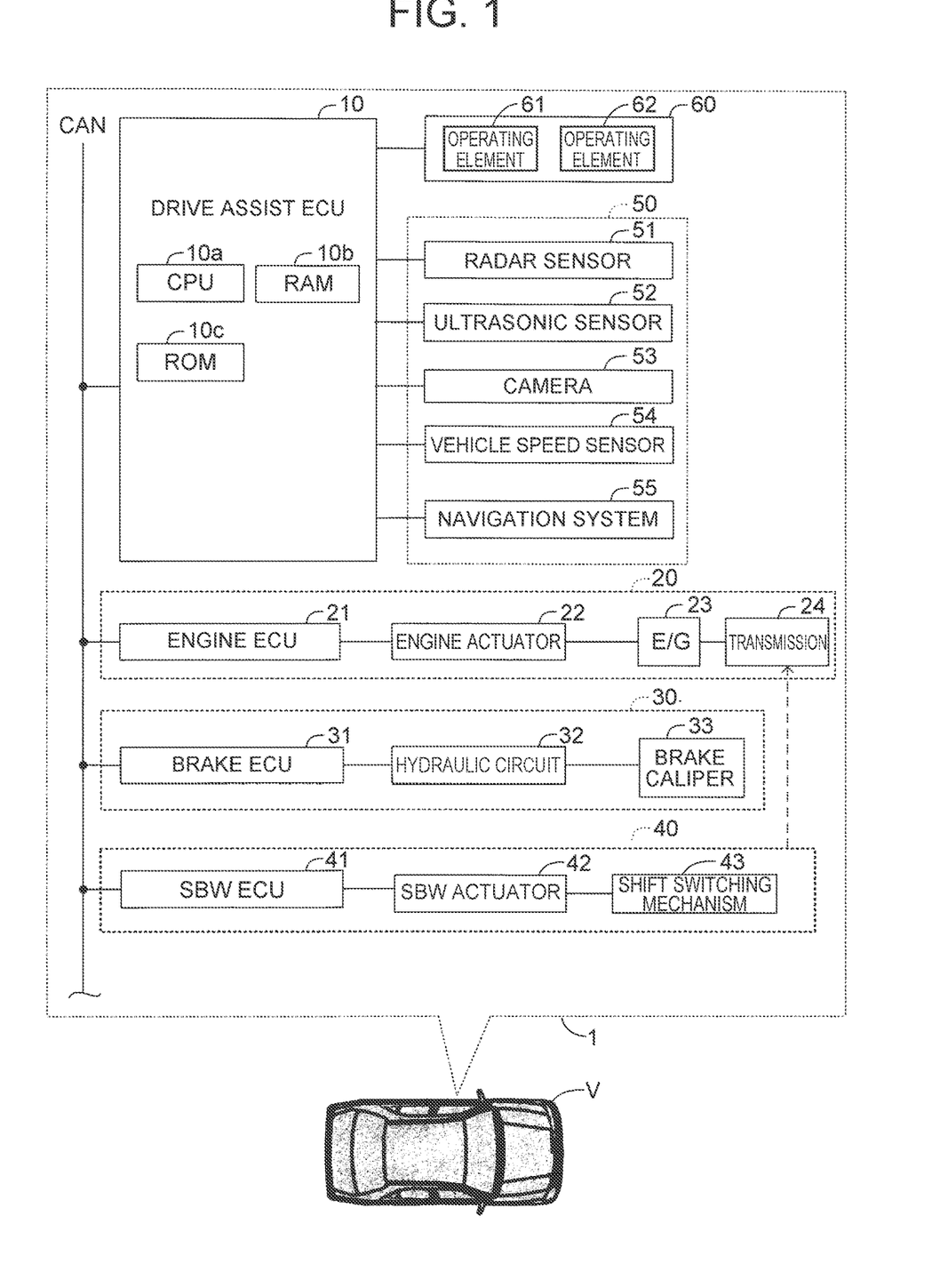
FIG. 1 is a block diagram of a drive assist device according to an embodiment of the present disclosure.

As shown in FIG. 1, a drive assist device 1 according to an embodiment of the present disclosure is mounted on a vehicle V. As described later in detail, the drive assist device 1 controls an engine, a brake, and others of the vehicle V such that the vehicle V travels at a constant speed or travels so as to follow a vehicle VF that travels in front of the vehicle V, based on information that is acquired from sensors mounted on the vehicle V. Hereinafter, this control is referred to as "cruise control". Furthermore, in the case where a predetermined condition is satisfied during the execution of the cruise control, the drive assist device 1 restrains the acceleration of the vehicle V. Hereinafter, this control is referred to as "acceleration restraint control". In the following description, the vehicle V is referred to as an "own vehicle", and the vehicle VF is referred to as a "preceding vehicle".

Specific Configuration

As shown in FIG. 1, the drive assist device 1 includes a drive assist ECU 10, a driving device 20, a braking device 30, a shift switching device 40, a periphery sensor 50, and an operation switch 60.

The drive assist ECU 10 has a microcomputer including a CPU 10$a$, a RAM 10$b$, a ROM 10$c$, and others. In the specification, the "ECU" means an electronic control unit, and includes a microcomputer including a CPU, a RAM, a ROM, and others. The CPU realizes various functions by executing instructions stored in the ROM.

The drive assist ECU 10 is connected with other ECUs (an engine ECU 21, a brake ECU 31, and a SBW ECU 41 described later) through a controller area network (CAN), such that information can be mutually sent and received.

The driving device 20 generates driving power, and gives the driving power to driving wheels of wheels (a left front wheel, a right front wheel, a left rear wheel, and a right rear wheel). The driving device 20 includes an engine ECU 21, an engine actuator 22, an internal combustion engine 23, a transmission 24, an unillustrated driving power transmitting mechanism that transmits the driving power to the wheels, and the like. The engine ECU 21 is connected with the engine actuator 22. The engine actuator 22 includes a throttle valve actuator that alters the opening degree of a throttle valve of the internal combustion engine 23. The engine ECU 21 can alter the torque to be generated by the internal combustion engine 23, by driving the engine actuator 22. The torque generated by the internal combustion engine 23 is transmitted to the driving wheels through the transmission 24 and the driving power transmitting mechanism (for example, a drive shaft). As described above, the engine ECU 21 controls the driving power of the vehicle V by controlling the engine actuator 22.

In the case where the vehicle V to which the drive assist device 1 is applied is a hybrid electric vehicle (PHEV or HEV), the engine ECU 21 can control the driving power to be generated by either or both of "internal combustion engine and electric motor" as vehicle driving sources. Further, in the case where the vehicle V to which the drive assist device 1 is applied is a battery electric vehicle (BEV), it is possible to control the driving power to be generated by an "electric motor" as a vehicle driving source.

The braking device 30 gives braking power to the wheel. The braking device 30 includes the brake ECU 31, a hydraulic circuit 32, and a brake caliper 33. The hydraulic circuit 32 includes a reservoir, an oil pump, various valve gears, a hydraulic sensor, and the like, which are not illustrated. The brake caliper 33 is a hydraulic actuator that includes a cylinder and a piston. When oil is supplied to the cylinder, the piston is pushed out of the cylinder. A brake pad is provided at a distal end of the piston, and the brake pad is pressed against a brake disc. The hydraulic circuit 32 adjusts the hydraulic pressure in the cylinder of the brake caliper 33, in response to a command from the brake ECU 31. Thereby, the braking power of the wheel (brake disc) by the brake caliper 33 is controlled.

The shift switching device 40 switches the shift position of the transmission 24. The shift switching device 40 includes the shift-by-wire (SBW) ECU 41, an SBW actuator 42, a shift switching mechanism 43, and the like. The SBW ECU 41 is connected with the SBW actuator 42. The SBW actuator 42 controls the shift switching mechanism 43 in response to a shift switching command from the SBW ECU 41, and switches the shift position of the transmission 24.

The periphery sensor 50 acquires vehicle surrounding information including information about a three-dimensional body in the periphery of the vehicle V and information about a mark line on a road surface in the periphery of the vehicle V. Examples of the three-dimensional body include a moving body such as an automobile (another vehicle), a pedestrian, and a bicycle, and a fixed body such as a guardrail and a traffic signal.

The periphery sensor 50 includes a radar sensor 51, an ultrasonic sensor 52, a camera 53, a vehicle speed sensor 54, and a navigation system 55.

The radar sensor 51 includes a radar sending-receiving unit (not illustrated) and a signal processing unit (not illustrated). The radar sending-receiving unit emits an electric wave (referred to as a "millimeter wave" hereinafter) having a millimeter-wave band, to a surrounding region of the vehicle, and receives a millimeter wave (that is, a reflected wave) reflected by the three-dimensional body existing within an emission range. The signal processing unit acquires (computes) information indicating the distance between the vehicle V and the three-dimensional body, the relative speed between the vehicle V and the three-dimensional body, the position (direction) of the three-dimensional body relative to the vehicle V, and the like, based on the phase difference between the sent millimeter wave and the received reflected wave, the attenuation level of the reflected wave, the time from the sending of the millimeter wave to the receiving of the reflected wave, and the like, and supplies the information to the drive assist ECU 10.

The ultrasonic sensor 52 sends a pulsed ultrasonic wave over a predetermined range in the periphery of the vehicle, and receives a reflected wave reflected by the three-dimensional body. The ultrasonic sensor acquires (computes) information indicating a "reflection point at which the sent ultrasonic wave is reflected on the three-dimensional body", the "distance between the ultrasonic sensor and the three-dimensional body", and the like, based on the time from the sending of the ultrasonic wave to the receiving of the reflected wave, and supplies the information to the drive assist ECU 10.

The camera 53 includes an image pickup device and an image analysis device. For example, the image pickup device is a digital camera that incorporates an image pickup element such as a charge-coupled device (CCD) or a CMOS image sensor (CIS). The image pickup device is disposed at an upper portion of a front windshield glass. The image pickup device photographs the forward sight of the vehicle at a predetermined frame rate, and outputs the obtained image data to the image analysis device. The image analysis device analyzes the acquired image data, and from the image, acquires (computes) information relevant to a physical body positioned forward of the vehicle V. Then, the image analysis device supplies the acquired information to the drive assist ECU 10. For example, the image analysis device recognizes a number plate of a preceding vehicle that travels forward of the vehicle V in the movement direction of the vehicle V. Then, the image analysis device acquires (computes) an inter-vehicle distance based on the size (area) of the portion of the number plate with respect to the whole of the image acquired from the image pickup device, and supplies the inter-vehicle distance to the drive assist ECU 10.

The vehicle speed sensor 54 includes a vehicle speed sensor that generates one pulse signal (wheel pulse signal) whenever the wheel of the own vehicle rotates by a predetermined angle. The vehicle speed sensor 54 measures a pulse number per unit time in the wheel pulse signal sent from a wheel speed sensor, calculates the rotation speed (wheel speed) of each wheel based on the measured pulse number, and calculates the speed (actual vehicle speed) of the own vehicle based on the wheel speed of each wheel. The vehicle speed sensor 54 sends data indicating the calculation result, to the drive assist ECU 10.

The navigation system 55 receives GPS signals from a plurality of artificial satellites, and detects the current place (latitude and longitude) of the vehicle V, based on the received GPS signals. Further, the navigation system 55 stores map data indicating a map. The map data includes road information indicating roads and traffic light position information indicating installation positions of traffic lights. The navigation system 55 sends vehicle position data indicating the detected current place of the vehicle V, to the drive assist ECU 10. Furthermore, the navigation system 55 has a function to calculate the distance (the distance along the road) between two spots.

The operation switch 60 includes an operating element 61 (for example, a push-button switch operating element) that is operated when a driver requests the start or end of the cruise control. When the driver operates the operating element 61 (the driver pushes the button) in a period during which the cruise control is not being executed, the operating element 61 sends a cruise control start signal indicating "the driver requests the start of the cruise control (a start request for the cruise control)", to the drive assist ECU 10. On the other hand, when the driver operates the operating element 61 in a period during which the cruise control is being executed, the operating element 61 sends a cruise control end signal indicating "the driver requests the end of the cruise control (an end request for the cruise control)", to the drive assist ECU 10. When the drive assist ECU 10 receives the cruise control start signal, the drive assist ECU 10 sets a cruise control flag Fa indicating whether the cruise control can be executed, to "1". On the other hand, when the drive assist ECU 10 receives the cruise control end signal, the drive assist ECU 10 sets the cruise control flag Fa to "0".

Further, the operation switch 60 includes an operating element 62 (for example, a push-button switch operating element) for switching between a state where the execution of acceleration restraint control described later is permitted and a state where the execution of the acceleration restraint control is prohibited. When the driver operates the operating element 62 (the driver pushes the button) in a period during which the execution the acceleration restraint control is prohibited, the operating element 62 sends an acceleration restraint permission signal indicating "the driver permits the execution of the acceleration restraint control", to the drive assist ECU 10. On the other hand, when the driver operates the operating element 62 in a period during which the execution of the acceleration restraint control is permitted, the operating element 62 sends an acceleration restraint prohibition signal indicating "the driver prohibits the execution of the acceleration restraint control", to the drive assist ECU 10. When the drive assist ECU 10 receives the acceleration restraint permission signal, the drive assist ECU 10 sets an acceleration restraint control flag Fb indicating whether the acceleration restraint control can be executed, to "1". On the other hand, when the drive assist ECU 10 receives the acceleration restraint prohibition signal, the drive assist ECU 10 sets the acceleration restraint control flag Fb to "0".

Further, the operation switch 60 includes an operating element for designating a target value Vd of the vehicle speed at the time of constant-speed traveling control described later.

Behavior

Next, the cruise control that is executed by the drive assist device 1 will be described. The cruise control includes the constant-speed traveling control and follow-up control. The constant-speed traveling control has no direct relation with the present disclosure. Therefore, only an outline will be described about the constant-speed traveling control, while the follow-up control will be described in detail.

When the drive assist ECU 10 receives the cruise control start signal from the operation switch 60, the drive assist ECU 10 starts the cruise control (ACC). After the drive assist ECU 10 starts the cruise control, the drive assist ECU 10 successively determines whether there is another vehicle (preceding vehicle) that the vehicle V needs to follow up, based on the information acquired from the periphery sensor 50.

Constant-Speed Traveling Control

In the case where the drive assist ECU 10 determines that there is no preceding vehicle that the vehicle V needs to follow up, the drive assist ECU 10 controls the driving device 20, the braking device 30, and the shift switching device 40 (which are referred to as a "driving device group" hereinafter), such that the speed of the own vehicle coincides with the target value Vd, which is previously set.

Follow-Up Control

On the other hand, in the case where the drive assist ECU 10 determines that there is a preceding vehicle that the vehicle V needs to follow up, the drive assist ECU 10 detects (measures) an inter-vehicle distance L between the preceding vehicle and the own vehicle, based on the vehicle surrounding information acquired from the periphery sensor 50. Furthermore, the drive assist ECU 10 computes the speed and acceleration rate of the preceding vehicle, based on the speed of the own vehicle, the change in the inter-vehicle distance L, and the like. Furthermore, the drive assist ECU 10 computes the acceleration rate of the own vehicle, based on the change in the speed of the own vehicle. The periphery sensor 50 may include an acceleration sensor. In that case, the drive assist ECU 10 acquires the acceleration rate of the own vehicle from the acceleration sensor. Furthermore, the drive assist ECU 10 computes a target value Ld of the inter-vehicle distance L, based on the speed of the own vehicle, the speed of the preceding vehicle, and the like.

In the case where the speed (relative speed Vr) of the preceding vehicle relative to the speed of the own vehicle is higher than "0", the inter-vehicle distance L increases. In a state where the inter-vehicle distance L has become larger than the target value Ld, the drive assist ECU 10 sets a target acceleration rate of the own vehicle, such that the speed of the own vehicle becomes higher than the speed of the preceding vehicle. Then, the drive assist ECU 10 controls the driving device group such that the acceleration rate of the own vehicle coincides with the target acceleration rate (referred to as "acceleration control" hereinafter). Thereby, the inter-vehicle distance L having become larger than the target value Ld starts to return to the target value Ld. Then, when the inter-vehicle distance L has coincided with the target value Ld, the drive assist ECU 10 sets the target acceleration rate of the own vehicle, to "0". That is, the drive assist ECU 10 controls the driving device group such that the own vehicle travels at the same speed as the speed of the preceding vehicle.

On the other hand, in the case where the speed of the preceding vehicle relative to the speed of the own vehicle is lower than "0", the inter-vehicle distance L decreases. In a state where the inter-vehicle distance L has become smaller than the target value Ld, the drive assist ECU 10 sets the target acceleration rate of the own vehicle, such that the speed of the own vehicle becomes lower than the seed of the preceding vehicle. Then, the drive assist ECU 10 controls the driving device group such that the acceleration rate of the own vehicle coincides with the target acceleration rate (referred to as "deceleration control" hereinafter). Thereby, the inter-vehicle distance L having become smaller than the target value Ld starts to return to the target value Ld. Then, when the inter-vehicle distance L has coincided with the target value Ld, the drive assist ECU 10 sets the acceleration rate of the own vehicle, to "0". The target value Ld is correlated with the speed of the own vehicle and the speed of the preceding vehicle. A database (table) indicating the relation between the speeds and the target value Ld or a parameter prescribing a computing equation that decides the target value Ld is stored in the ROM 10c. In the database or the computing equation, a comparatively small target value Ld is assigned to a comparatively low speed, and a comparatively large target value Ld is assigned to a comparatively high speed. In principle, the drive assist ECU 10 sets the upper limit of the target acceleration rate, to a predetermined value A higher than "0" (to a value previously prescribed as the upper limit of an acceleration rate at which an occupant does not have an uncomfortable feeling).

Suppose a situation where congestion has occurred on a lane where the own vehicle travels and where the inter-vehicle distance L has increased due to a temporary acceleration of the preceding vehicle. In this situation, there is a possibility that the preceding vehicle decelerates shortly after the temporary acceleration of the preceding vehicle although the congestion has not been actually resolved. In this case, when the own vehicle follows up the preceding vehicle, there is fear that the occupant of the own vehicle feels uncomfortable, as described above.

Hence, as described below; the drive assist ECU 10 estimates whether the congestion has occurred (the congestion is being continued) (whether the congestion has been resolved). Then, in the case where the drive assist ECU 10 estimates that the congestion has occurred (the congestion is being continued), the drive assist ECU 10 restrains the acceleration of the own vehicle.

Specifically, the drive assist ECU 10 estimates whether the congestion has been resolved, based on the speed and acceleration rate of a vehicle that travels on an adjacent lane, in addition to the inter-vehicle distance L and the relative speed Vr (the speed of the preceding vehicle relative to the own vehicle), and performs the switching between a state where the acceleration of the own vehicle is prohibited and a state where the acceleration of the own vehicle is permitted, depending on the estimated result.

More specifically, in the case where an acceleration restraint start condition described below is satisfied, the drive assist ECU 10 starts the acceleration restrain control that is control to restrain (prohibit) the execution of the acceleration control. Specifically, in the case where the acceleration restraint start condition is satisfied, the drive assist ECU 10 sets the upper limit of the target acceleration rate of the own vehicle, to "0". Even when the drive assist ECU 10 is executing the acceleration restraint control, the execution of the deceleration control is permitted. Further, in a state where the execution of the acceleration restraint control is prohibited (in a state where the driver has operated the operation switch 60 to request the prohibition of the execution of the acceleration restraint control), the drive assist ECU 10 does not start the acceleration restraint control even when the acceleration restraint start condition is satisfied.

The acceleration restraint start condition is constituted by the following Conditions X, Y, and Z. The acceleration restraint start condition is satisfied when one of the following cases is satisfied.

A case where (Condition X) is satisfied and where (Condition Y) is satisfied

A case where (Condition X) is satisfied, where (Condition Y) is unsatisfied, and where (Condition Z) is satisfied Condition X is defined as follows.

(Condition X) The speed of the own vehicle is lower than a threshold $\alpha$.

Further, Condition Y is constituted by Condition Y1 and Condition Y2. Condition Y1 and Condition Y2 are defined as follows. Condition Y is satisfied in the case where Condition Y1 and Condition Y2 are satisfied.

(Condition Y1) The inter-vehicle distance L is smaller than a threshold $\beta$.

(Condition Y2) The relative speed Vr is lower than a threshold $\gamma$.

Further, Condition Z is constituted by Condition Z1 to Condition Z4. Condition Z1 to Condition Z4 are defined as follows. Condition Z is satisfied in the case where Condition Z1 to Condition Z4 are satisfied.

(Condition Z1) The inter-vehicle distance L is smaller than a threshold $\delta(>\beta)$.

(Condition Z2) The relative speed Vr is lower than a threshold $\epsilon(>\gamma)$.

(Condition Z3) A speed Vn of the vehicle on the adjacent lane is lower than a threshold $\xi(>\gamma)$.

(Condition Z4) An acceleration rate an of the vehicle on the adjacent lane is lower than a threshold $\eta$.

The drive assist ECU 10 successively computes the speed Vn and the acceleration rate an of the vehicle that travels on the adjacent lane, based on information acquired from the radar sensor 51 and the ultrasonic sensor 52, information acquired from the vehicle speed sensor 54, and the like. The "adjacent lane" is a lane that extends in the same direction as the direction of the lane where the own vehicle travels. The "vehicle that travels on the adjacent lane" is a vehicle that is closest to the own vehicle. The average of speeds of a plurality of vehicles that travels near the own vehicle and the average of acceleration rates of the vehicles may be employed as the speed Vn and the acceleration rate an.

When the above acceleration restraint condition is satisfied, the drive assist ECU 10 starts the acceleration restraint control. That is, the drive assist ECU 10 sets the upper limit of the target acceleration rate, to "0".

When an acceleration restraint stop condition described later is satisfied during the execution of the acceleration restraint control, the drive assist ECU 10 stops the execution of the acceleration restraint control. That is, the drive assist ECU 10 sets the upper limit of the target acceleration rate, to the predetermined value A (>0).

The acceleration restraint stop condition is constituted by the following Condition W and the above-described Condition Y and Condition Z. The acceleration restraint stop condition is satisfied when one of the following cases is satisfied.

A case where (Condition W) is satisfied

A case where (Condition W), (Condition Y), and (Condition Z) are unsatisfied

Condition W is defined as follows.

(Condition W) The speed of the own vehicle is lower than a threshold $\theta(<\alpha)$.

Furthermore, when a predetermined time has elapsed since the start of the acceleration restraint control, the drive assist ECU 10 stops the execution of the acceleration restraint control even when the acceleration restraint stop condition is unsatisfied. Further, in the case where the driver operates the operating element 62 to request the prohibition of the acceleration restraint control in the state where the acceleration restraint control is permitted (in the state where the acceleration restraint control flag Fb is "1"), the drive assist ECU 10 immediately stops the execution of the acceleration restraint control.

When the drive assist ECU 10 stops the execution of the acceleration restraint control, the drive assist ECU 10 sets the acceleration restraint control flag Fb to "0" even when the operating element 62 is not operated. That is, the drive assist ECU 10 becomes a state where the drive assist ECU 10 cannot execute the acceleration restraint control. When the speed of the own vehicle exceeds a threshold Vth, the drive assist ECU 10 sets the acceleration restraint control flag Fb to "1". However, in the case where the driver operates the operating element 62 to permit the execution of the acceleration restraint control before the speed of the own vehicle exceeds the threshold Vth, the drive assist ECU 10 immediately transitions to a state where the drive assist ECU 10 can execute the acceleration restraint control.

In the case where there is no adjacent lane or there is no vehicle that travels on the adjacent lane, (Condition Z3) and (Condition Z4) are unsatisfied, and therefore the acceleration restraint condition is unsatisfied. Consequently, in this case, the drive assist ECU 10 sets the upper limit of the target acceleration rate, to the predetermined value A.

Next, actions (an acceleration restraint control start program and an acceleration restraint control stop program that realize the start and stop of the above acceleration restraint control) of a CPU (referred to as merely a "CPU" hereinafter) of the drive assist ECU 10 will be specifically with reference to FIG. 2 and FIG. 3.

Figure 2:
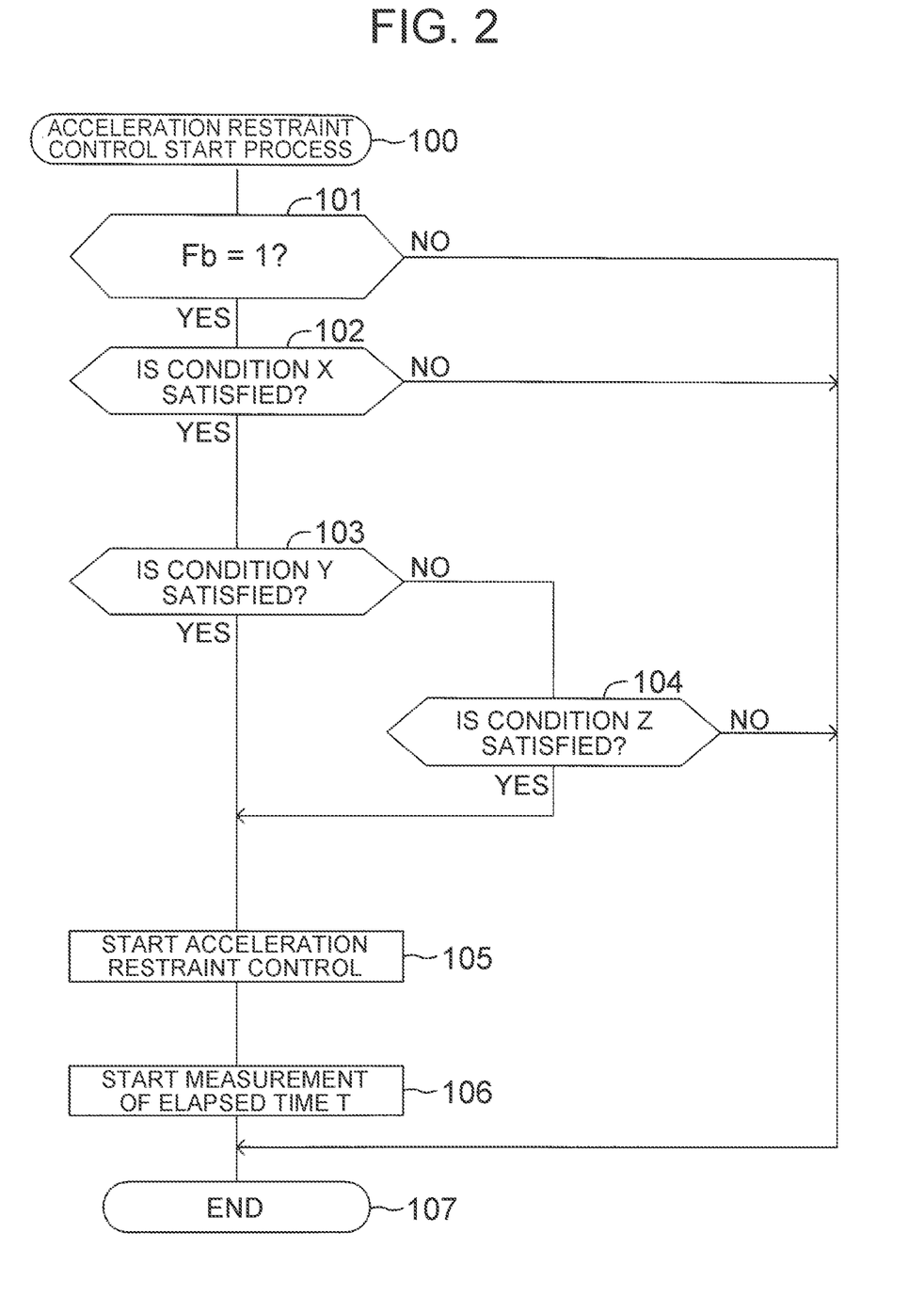
FIG. 2 is a flowchart of an acceleration restraint control start program.
Figure 3:
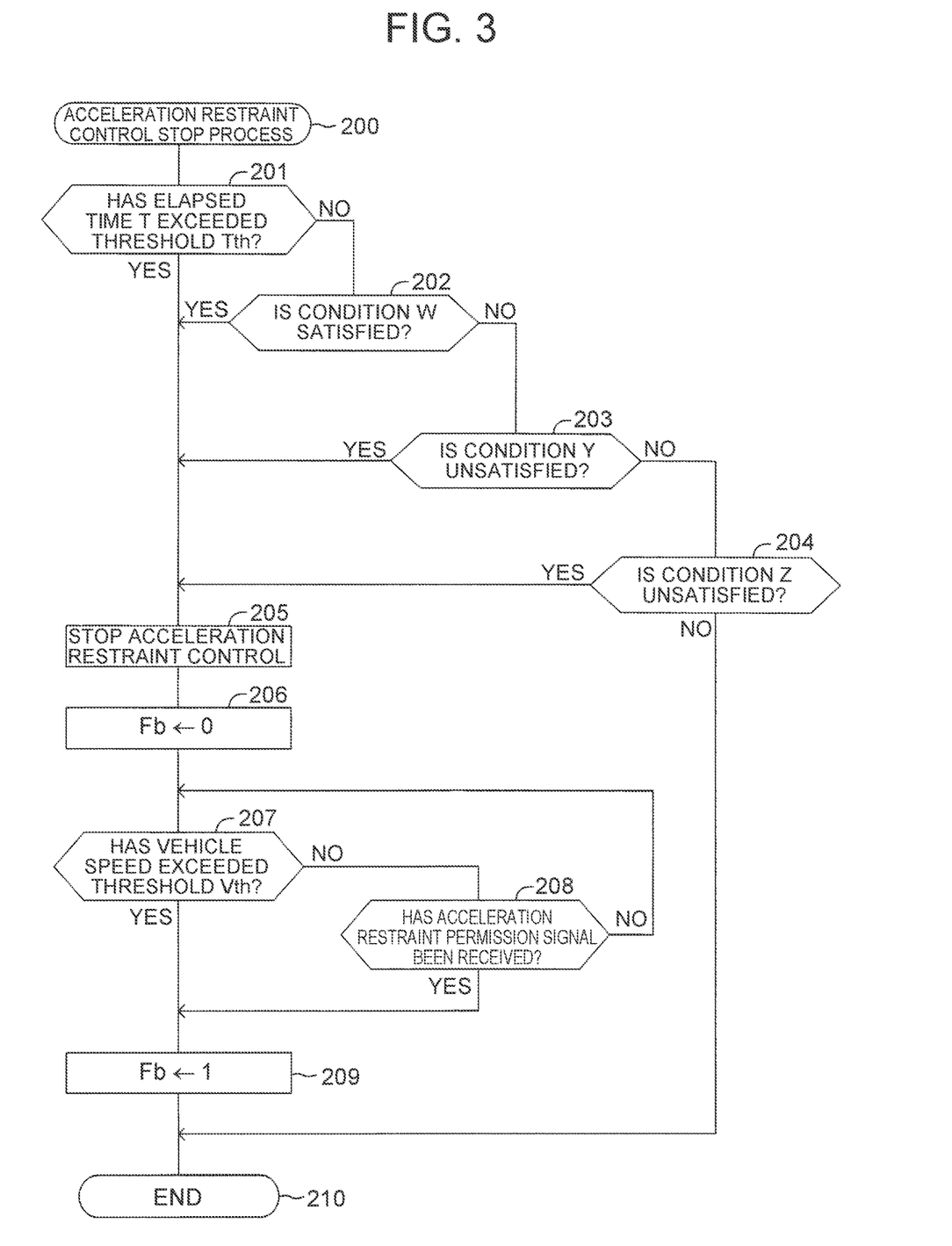
FIG. 3 is a flowchart of an acceleration restraint control stop program.

The CPU executes an acceleration restraint control start program shown in FIG. 2, at a predetermined time interval, in a situation where the acceleration restraint control is not being executed (in the case where the upper limit of the acceleration rate is the predetermined value A). Further, the CPU executes an acceleration restraint control stop program shown in FIG. 3, at a predetermined time interval, in a situation where the acceleration restraint control is being executed (in the case where the upper limit of the acceleration rate is "0").

Acceleration Restraint Control Start Program

The CPU starts an acceleration restraint control start process at step 100, and proceeds to step 101.

When the CPU proceeds to step 101, the CPU determines whether the acceleration restraint control flag Fb is "1". That is, the CPU determines whether the execution of the acceleration restraint control is permitted. In the case where the acceleration restraint control flag Fb is "1" (101: Yes), the CPU proceeds to step 102. On the other hand, in the case where the acceleration restraint control flag Fb is "0" (101: No), the CPU proceeds to step 107, and ends the acceleration restraint control start process. That is, in this case, the CPU does not start the acceleration restraint control.

When the CPU proceeds to step 102, the CPU determines whether Condition X is satisfied. In the case where Condition X is satisfied (102: Yes), the CPU proceeds to step 103. On the other hand, in the case where Condition X is not satisfied (102: No), the CPU proceeds to step 107, and ends the acceleration restraint control start process.

When the CPU proceeds to step 103, the CPU determines whether Condition Y is satisfied. In the case where Condition Y is satisfied (103: Yes), the CPU proceeds to step 105. On the other hand, in the case where Condition Y is not satisfied (103: No), the CPU proceeds to step 104.

When the CPU proceeds to step 104, the CPU determines whether Condition Z is satisfied. In the case where Condition Z is satisfied (104: Yes), the CPU proceeds to step 105. On the other hand, in the case where Condition Z is not satisfied (104: No), the CPU proceeds to step 107, and ends the acceleration restraint control start process.

When the CPU proceeds to step 105, the CPU starts the acceleration restraint control. That is, the CPU sets the upper limit of the acceleration rate of the own vehicle, to "0". Next, the CPU proceeds to step 106. When the CPU proceeds to step 106, the CPU starts the measurement of an elapsed time T. Then, the CPU proceeds to step 107, and ends the acceleration restraint control start process.

Acceleration Restraint Control Stop Program

The CPU starts an acceleration restraint control stop process at step 200, and proceeds to step 201.

When the CPU proceeds to step 201, the CPU determines whether the elapsed time T from the start of the acceleration restraint control has exceeded a predetermined threshold Tth. In the case where the elapsed time T has exceeded the threshold Tth (201: Yes), the CPU proceeds to step 205. On the other hand, in the case where the elapsed time T is equal to or less than the threshold Tth (201; No), the CPU proceeds to step 202.

When the CPU proceeds to step 202, the CPU determines whether Condition W is satisfied. In the case where Condition W is satisfied (202: Yes), the CPU proceeds to step 205. On the other hand, in the case where Condition W is unsatisfied (202: No), the CPU proceeds to step 203.

When the CPU proceeds to step 203, the CPU determines whether Condition Y is unsatisfied. In the case where Condition Y is unsatisfied (203: Yes), the CPU proceeds to step 205. On the other hand, in the case where Condition Y is satisfied (203: No), the CPU proceeds to step 204.

When the CPU proceeds to step 204, the CPU determines whether Condition Z is unsatisfied. In the case where Condition Z is unsatisfied (204: Yes), the CPU proceeds to step 205. On the other hand, in the case where Condition Z is satisfied (204: No), the CPU proceeds to step 210, and ends the acceleration restraint control stop process.

When the CPU proceeds to step 205, the CPU stops the execution of the acceleration restraint control. That is, the CPU sets the upper limit of the acceleration rate of the own vehicle, to the predetermined value A. Next, the CPU proceeds to step 206.

When the CPU proceeds to step 206, the CPU sets the acceleration restraint control flag Fb to "0". Next, the CPU proceeds to step 207.

When the CPU proceeds to step 207, the CPU determines whether the vehicle speed of the own vehicle has exceeded the threshold Vth. In the case where the vehicle speed of the own vehicle has exceeded the threshold Vth (207: Yes), the CPU proceeds to step 209. On the other hand, in the case where the vehicle speed of the own vehicle is equal to or less than the threshold Vth (207: No), the CPU proceeds to step 208.

When the CPU proceeds to step 208, the CPU determines whether the CPU has received the acceleration restraint permission signal from the operation switch 60 (whether the driver has operated the operating element 62 to permit the execution of the acceleration restraint control). In the case where the CPU has received the acceleration restraint permission signal (208: Yes), the CPU proceeds to step 209. On the other hand, in the case where the CPU has received the acceleration restraint permission signal, the CPU returns to step 207.

When the CPU proceeds to step 209, the CPU sets the acceleration restraint control flag Fb to "1". Then, at step 210, the CPU ends the acceleration restraint control stop process.

Effect

As described above, in the case where the inter-vehicle distance L is comparatively small and where the relative speed Vr is comparatively low, the drive assist ECU 10 executes the acceleration restraint control. Further, even in the case where the inter-vehicle distance L is large to some extent or in the case where the relative speed Vr is high to some extent, the drive assist ECU 10 estimates that the congestion has not been resolved and executes the acceleration restraint control, when the speed Vn and the acceleration rate an of the adjacent vehicle are comparatively low. That is, with the embodiment, in a situation where there is a high possibility that the preceding vehicle repeats acceleration and deceleration, it is possible to restrain the own vehicle from repeating acceleration and deceleration while following up the preceding vehicle. Consequently, it is possible to reduce the uncomfortable feeling of the occupant of the own vehicle, compared to the conventional device (a device that does not have a function to estimate whether the congestion has been resolved).

Further, the drive assist ECU 10 prohibits the execution of the acceleration restraint control after the drive assist ECU 10 stops the execution of the acceleration restraint control and before the speed of the own vehicle exceeds the predetermined threshold. Thereby, it is possible to restrain the acceleration restraint control from being frequently executed.

The present disclosure is not limited to the above embodiment, and various modifications can be employed within the scope of the present disclosure, as described below.

In the above embodiment, the definition "Condition Z is satisfied in the case where Condition Z1 to Condition Z4 are satisfied" is adopted. Instead, a definition "Condition Z is satisfied in the case where at least one of Condition Z1 and Condition Z2 is satisfied and where at least one of Condition Z3 and Condition Z4 is satisfied" may be adopted.

Further, the drive assist ECU 10 may determine whether the acceleration restraint start condition is satisfied, only in the case where the adjacent lane is neither a branch lane nor a right turn (left turn) lane and is the same kind as the lane for the own vehicle. Further, it is allowable to adopt such a configuration that in the case where the vehicle traveling on the adjacent lane is an emergency vehicle, the drive assist ECU 10 does not employ the speed and acceleration rate of the emergency vehicle as the above speed Vn and acceleration rate an.

What is claimed is:

1. A drive assist device comprising:
   a driving device configured to give driving power to a driving wheel of an own vehicle;

a braking device configured to give braking power to the driving wheel;

a periphery sensor configured to output surrounding information that is information relevant to a physical body in a periphery of the own vehicle; and a drive assist control device configured to decide a target value of an inter-vehicle distance between a preceding vehicle and the own vehicle based on the surrounding information, and to execute follow-up control to control the driving device and the braking device such that a measured value of the inter-vehicle distance coincides with the target value, the preceding vehicle traveling in front of the own vehicle, the measured value of the inter-vehicle distance being acquired based on the surrounding information, wherein:

a first condition is defined as a condition that the inter-vehicle distance is smaller than a first threshold;

a second condition is defined as a condition that a speed of the preceding vehicle relative to the own vehicle is lower than a second threshold;

a third condition is defined as a condition that a speed of an adjacent vehicle is lower than a third threshold, the adjacent vehicle being a vehicle that travels on a lane adjacent to a lane where the own vehicle is;

a fourth condition is defined as a condition that an acceleration rate of the adjacent vehicle is lower than a fourth threshold; and in a case where at least one of the first condition and the second condition is satisfied and where at least one of the third condition and the fourth condition is satisfied, the drive assist control device executes acceleration restraint control to control either or both of the driving device and the braking device such that an acceleration rate of the own vehicle is "0" or lower.

2. The drive assist device according to claim 1, wherein:

a fifth condition is defined as a condition that the inter-vehicle distance between the own vehicle and the preceding vehicle is smaller than a fifth threshold that is smaller than the first threshold;

a sixth condition is defined as a condition that the speed of the preceding vehicle relative to the own vehicle is lower than a sixth threshold that is smaller than the second threshold; and in a case where the fifth condition and the sixth condition are satisfied or in a case where either or both of the fifth condition and the sixth condition are unsatisfied, where at least one of the first condition and the second condition is satisfied, and where at least one of the third condition and the fourth condition is satisfied, the drive assist control device executes the acceleration restraint control.

3. The drive assist device according to claim 1, wherein in a case where the first condition to the fourth condition are satisfied, the drive assist control device executes the acceleration restraint control.

4. The drive assist device according to claim 3, wherein in a case where at least one of the first condition to the fourth condition has been unsatisfied during the execution of the acceleration restraint control, the drive assist control device stops the execution of the acceleration restraint control.

5. The drive assist device according to claim 4, wherein the drive assist control device prohibits the execution of the acceleration restraint control after the drive assist control device stops the execution of the acceleration restraint control and before a speed of the own vehicle exceeds a predetermined threshold.

\* \* \* \* \*